No. 734,912. PATENTED JULY 28, 1903.
A. H. MARKS.
PNEUMATIC TIRE.
APPLICATION FILED SEPT. 9, 1902.
NO MODEL.
Fig. 1.
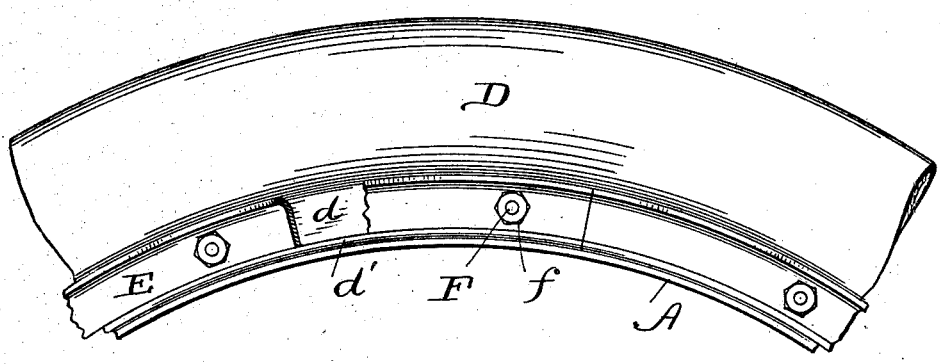
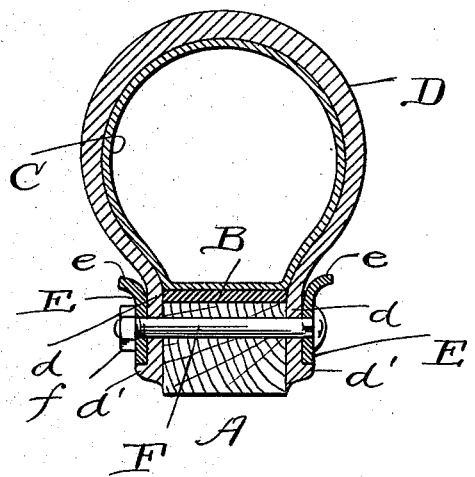
Fig. 2.
Witnesses.
E. B. Filchrist
N. L. Bresnan
Inventor
Arthur H. Marks,
By his Attorneys,
Thurston & Bates No. 734,912.                                              Patented July 28, 1903.

UNITED STATES PATENT OFFICE.

ARTHUR H. MARKS, OF AKRON, OHIO, ASSIGNOR TO THE DIAMOND RUBBER COMPANY, OF AKRON, OHIO, A CORPORATION OF OHIO.

PNEUMATIC TIRE.

SPECIFICATION forming part of Letters Patent No. 734,912, dated July 28, 1903.

Application filed September 9, 1902. Serial No. 122,698. (No model.)

*To all whom it may concern:*

Be it known that I, ARTHUR H. MARKS, a citizen of the United States, residing at Akron, in the county of Summit and State of Ohio, have invented a certain new and useful Improvement in Pneumatic Tires, (Case A,) of which the following is a full, clear, and exact description, reference being had to the accompanying drawings.

The object of this invention is to provide in very simple and efficient form a pneumatic tire having an outer sheath securely held to the rim, whether the tire be inflated or not, but capable of ready removability when desired. In automobile use especially it is extremely desirable not to rely on the inflation of the tire to hold it in place, for in that case a puncture when the machine is running rapidly is very liable to cause an accident by reason of the tire leaving the rim. In my invention, as stated, the tire is securely held to the rim whether inflated or not; and the invention consists of the means employed to this end, as hereinafter described and as fully set out in the claim.

The drawings clearly illustrate my invention, Figure 1 being a side elevation of a portion of my tire in place on the wheel-rim. Fig. 2 is a transverse section of the same.

Referring to the parts by letters, A represents the wheel-rim shown as made of wood. This is surrounded by a flat metal band B, whereby a strong and rigid rim is provided.

C represents the inner pneumatic tube of the tire, and D the outer sheath thereof. This sheath extends inward on opposite sides of the rim, as at $d$, where it is flat. Outside of these flat portions are the side plates E. These side plates are clamped against the sheath D by bolts F passing through them, through the sheath and the rim, and taking on their ends nuts $f$. The outer edges of the plates E are curved away from the tire, as shown at $e$, so as not to cut the sheath as it flattens under pressure. At each lower edge of the sheath it is provided with an abrupt flange extending at right angles to the sheath. This flange extends outwardly, as at $d'$, and takes beneath the side plate E, the outer surface of said flange being substantially flush with the outer surface of said plate. The plate E forms an abrupt shoulder above the abrupt flange $d'$. These interlocking shoulders, in connection with the plates, securely hold the tire to the rim whether inflated or not. At the same time the removal of the sheath for repair is very easily accomplished.

The side plates E are preferably made in sections, so that in case of puncture only a part of one side need be removed.

I claim—

In a detachable pneumatic tire, the combination, with the rim, of an inner tube, an outer sheath having at its lower edges flanges projecting abruptly outwardly, side plates outside of the sheath with their lower edges abutting against said flanges, the outer surfaces of said flanges being flush with the outer surfaces of said plates, and bolts passing through the plates, the sheath, and the rim above said flanges, substantially as described.

In testimony whereof I hereunto affix my signature in the presence of two witnesses.

ARTHUR H. MARKS.

Witnesses:
D. GALEHOUSE,
O. S. HART.